Aug. 7, 1928.
G. H. BRUNOW
1,679,763
RELIEF VALVE
Filed Aug. 28, 1926
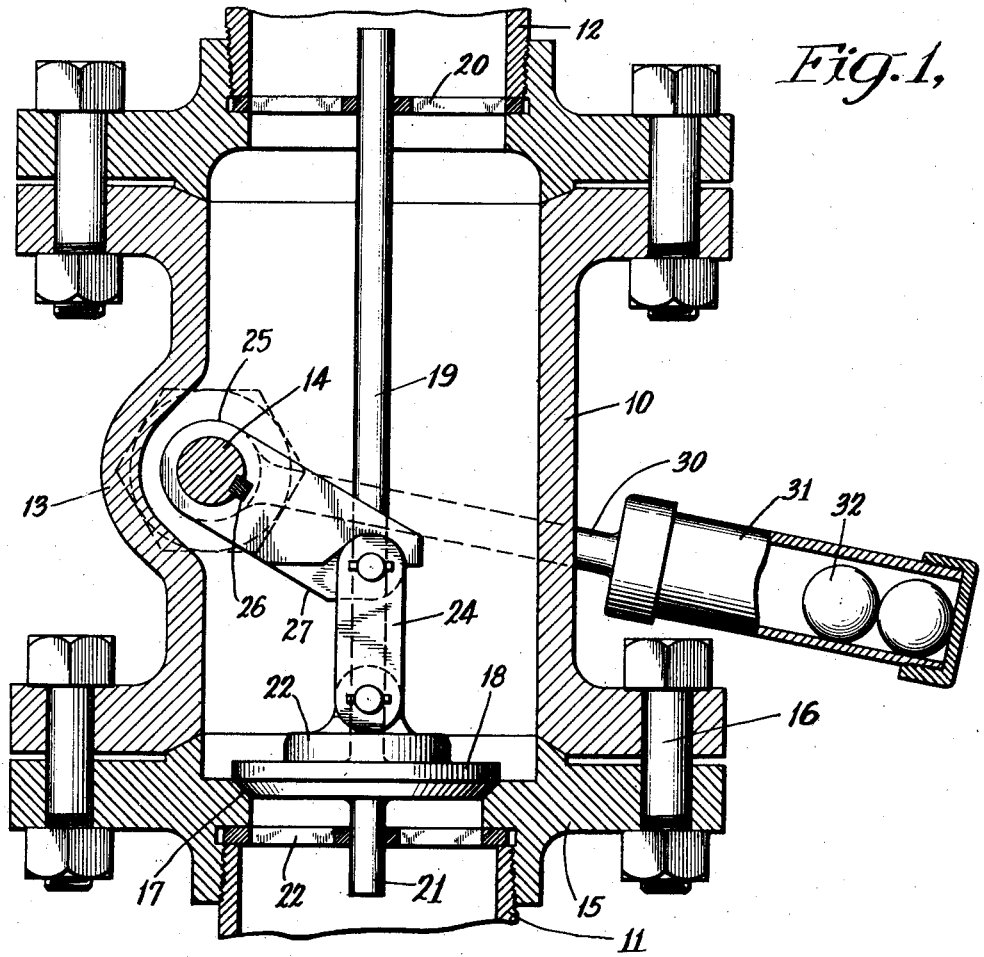
Fig.1,
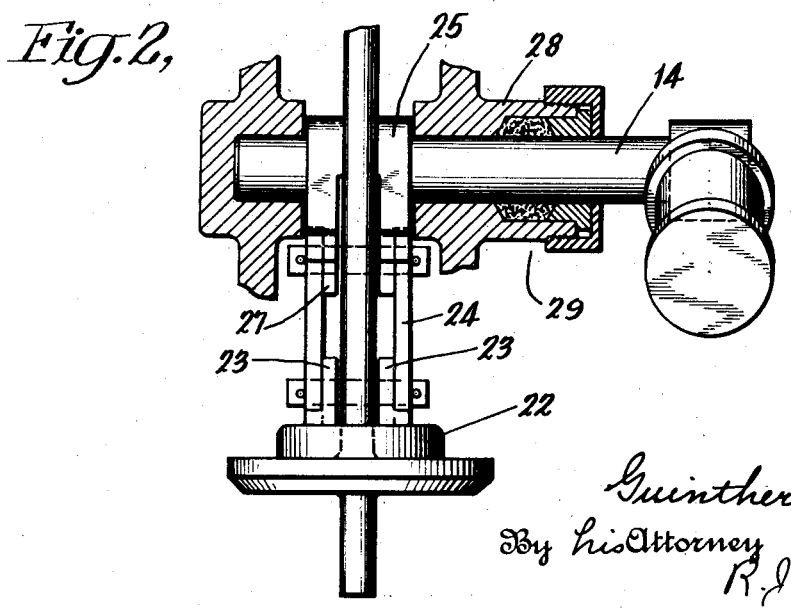
Fig.2,
Inventor
Guinther H. Brunow,
By his Attorney
R. J. Dearborn Patented Aug. 7, 1928.

1,679,763

UNITED STATES PATENT OFFICE.

GUNTHER H. BRUNOW, OF PORT ARTHUR, TEXAS.

RELIEF VALVE.

Application filed August 28, 1926. Serial No. 132,293.

This invention relates to relief valves.

One of the objects of the present invention is to provide a relief valve which will open and close with accelerated motion when predetermined high or low pressures are exceeded.

Still another object of the invention is to provide a relief valve which is of simple construction, inexpensive, yet certain in operation.

A further object of the invention is to provide a relief valve wherein the force of gravity is utilized for actuating the opening and closing mechanism.

Other objects, features, and advantages of the invention will appear as the description of the preferred embodiment thereof, taken in connection with the accompanying drawing, proceeds.

In the drawing:

Fig. 1 is a view in sectional elevation of a relief valve constructed in accordance with the present invention.

Fig. 2 is a view in sectional elevation of a portion of the apparatus.

The valve described herein is adapted for use in connection with various types and kinds of pressure apparatus, and inasmuch as it is particularly well adapted for use in connection with an oil still it will be described, for the purpose of illustration, as being used in connection with a still.

Referring to the drawing, 10 is a cylindrical chambered member connected at its opposite ends with pipes 11 and 12. The pipe 11 ordinarily leads to the vapor line of a still (not shown) but may connect directly with the still. The pipe 12 serves as an outlet through which the gases and vapors escaping when the relief valve is opened may be conducted away for such disposition as may be desired. The cylinder 10 is cast with a recess 13 in which a shaft 14 is journaled in suitable bearings formed therein.

The inlet pipe 11 connects with the cylinder 10 through a flanged ring 15, which is suitably secured to the lower flanged end of the cylinder by means of bolts 16. The inner periphery of the ring 15 is recessed to form a seat 17 for a valve 18. A valve stem 19 is formed integral with or suitably secured to the upper face of the valve 18 and extends upwardly through the cylinder and through a spider 20 adapted to maintain the upper end of the valve stem in vertical position. A projection 21 on the lower face of the valve 18 extends through a similar spider 22 disposed between the end of the inlet pipe 11 and the ring 15.

A ring 22 is loosely mounted on the valve 18 and is formed with lugs 23 by which straps 24 are pivotally attached to the ring 22. The lugs are recessed so as to accommodate the lower ends of the straps 24.

A yoke 25 is mounted on the shaft 14 and is prevented from turning thereon by means of a key 26. Each leg 27 of the yoke is recessed to receive one end of one of the straps 24, each of which is pivotally attached to one of the legs of the yoke.

One end of the shaft 14 extends through a bearing 28 formed in the wall of the cylinder 10 and through a stuffing box 29. An arm 30 is secured to the outer end of the shaft 14 and on the free end of the arm there is attached a tubular member 31 closed at both ends and adapted to contain movable members such as steel balls 32 which are free to roll from one end of the tubular member to the other as the position of the arm 30 changes. If preferred, the tubular member may be so constructed as to contain a relatively heavy liquid, such as mercury, which will flow from one end of the tube to the other as the position of the tube is changed, the liquid merely being used instead of the metal balls already described. In lieu of the tubular member containing either movable members or a liquid the arm 30 could be provided with a slidable weight so mounted on the arm that it would readily travel thereon.

The operation of the valve is as follows:

When the pressure within the still, or other apparatus to which the relief valve may be attached, exceeds that for which the valve has been adjusted, the valve 18 is forced upwardly from its seat carrying with it the ring 22. The upward movement of the ring moves the straps 24 upwardly and the upward movement thereof is transmitted through the legs 27 of the yoke 25 to the shaft 14 which is rotated in the assembly illustrated in a counter clockwise direction. The arm 30 is swung upwards causing the balls 32 to roll to the inner end of the tubular member. The pressure against the valve is thus quickly relieved and the popping off of the valve from its seat is accelerated. Similarly, when the pressure within the still is reduced the valve again moves downward towards its seat causing a downward incline of the arm 30 which obviously causes the balls to roll to the outer end of the tubular member 31, thereby accelerating the closing movement of the valve.

A relief valve of preferred form and construction has been illustrated and described for the purpose of showing one way in which this invention may be practiced, but the inventive thought upon which the application is based is broader than this illustrative embodiment thereof. It is therefore understood that the scope of the invention is not to be limited by the present disclosure, reference being had to the appended claims for that purpose.

What I claim is:

1. In a pressure relief valve, the combination with a casing having an inlet and an outlet port and a valve normally closing the inlet port, of a valve stem formed integral with the valve, a ring loosely mounted on the valve stem and seated on the valve, a rotatable shaft mounted in the casing with one end extending through the wall of the casing, means operatively connecting the ring and the shaft so that any movement of the stem imparts a rotary movement to the shaft, a tubular member secured to the end of the shaft outside the casing, a movable weight, normally maintained in the outer end of the tubular member for maintaining the valve closed against the pressure for which it is adjusted, said movable member being adapted to shift its position rapidly to decrease the pressure exerted against the opening of the valve.

2. In a pressure relief valve, the combination with a casing having an inlet and an outlet port and a valve normally closing the inlet port, of a valve stem formed integral with the valve, a ring formed with a pair of spaced lugs loosely mounted on the valve stem and seated on the valve, a rotatable shaft mounted in the casing with one end extending through the wall of the casing, a yoke keyed to the shaft within the casing and formed with a pair of spaced and recessed legs, a pair of straps each pivotally connected at one end to one of the legs of the yoke and at their opposite ends pivotally connected to one of the lugs of the ring, a tubular member secured to the end of the shaft outside the casing, and a movable weight normally maintained in the outer end of the tubular member for maintaining the valve closed against the pressure for which it is adjusted, said movable member being adapted to shift its position rapidly by reason of the rotation of the shaft to decrease the pressure exerted against the opening of the valve.

3. In a pressure relief valve, the combination with a casing having an inlet and an outlet port and a valve normally closing the inlet port, of a valve stem connected to the upper face of the valve, a ring loosely mounted on the valve stem and seated on the valve, a rotatable shaft mounted in the casing with one end extending through the wall thereof, means connecting the ring and the shaft for rotating the shaft in response to any vertical movement of the ring, a tubular member operatively connected to the extended end of the shaft, and a movable weight in the tubular member adapted to shift its position in response to movements of the shaft for accelerating the opening and closing of the valve.

In witness whereof I have hereunto set my hand this 17th day of August, 1926.

GUNTHER H. BRUNOW.